United States Patent
Yamamoto et al.

(10) Patent No.: US 9,444,538 B2
(45) Date of Patent: Sep. 13, 2016

(54) RADIO COMMUNICATION SYSTEM AND CONTROLLING METHOD THEREOF

(75) Inventors: Katsushi Yamamoto, Minato-ku (JP); Yoshio Ito, Bunkyo-ku (JP)

(73) Assignee: NEC CORPORATION, Tokyo (JP)

(*) Notice: Subject to any disclaimer, the term of this patent is extended or adjusted under 35 U.S.C. 154(b) by 498 days.

(21) Appl. No.: 13/504,415

(22) PCT Filed: Sep. 9, 2010

(86) PCT No.: PCT/JP2010/065504
§ 371 (c)(1),
(2), (4) Date: Jul. 2, 2012

(87) PCT Pub. No.: WO2011/052300
PCT Pub. Date: May 5, 2011

(65) Prior Publication Data
US 2012/0262336 A1 Oct. 18, 2012

(30) Foreign Application Priority Data
Oct. 27, 2009 (JP) ................................ 2009-246520

(51) Int. Cl.
*H04B 7/06* (2006.01)
*H04B 7/10* (2006.01)

(52) U.S. Cl.
CPC ............ *H04B 7/0693* (2013.01); *H04B 7/063* (2013.01); *H04B 7/10* (2013.01)

(58) Field of Classification Search
CPC ...... H04B 7/0693; H04B 7/10; H04B 7/063; H04B 7/0689; H04B 17/006; H04B 17/0042; H04B 17/0057; H04B 17/0067

USPC ............ 455/450–452.2, 509, 67.11, 92, 101, 455/226.1–226.3; 342/361–366

See application file for complete search history.

(56) References Cited

U.S. PATENT DOCUMENTS

| 4,112,370 A | * | 9/1978 | Monsen | 370/201 |
| 2002/0198026 A1 | * | 12/2002 | Niemela | 455/562 |
| 2003/0186726 A1 | * | 10/2003 | Akita | H04B 7/0608 455/562.1 |

(Continued)

FOREIGN PATENT DOCUMENTS

| CN | 1369148 A | 9/2002 |
| CN | 1509529 A | 6/2004 |

(Continued)

OTHER PUBLICATIONS

Office Action, dated Mar. 5, 2014, issued by the State Intellectual Property Office of the People's Republic of China, in counterpart Application No. 201080047674.7.

(Continued)

*Primary Examiner* — Gennadiy Tsvey
(74) *Attorney, Agent, or Firm* — Sughrue Mion, PLLC

(57) ABSTRACT

The radio communication system includes: a transmitter that transmits a first polarized signal and a second polarized signal to a receiver and terminates the transmission of the second polarized signal in accordance with an instruction from the receiver; and the receiver that receives the polarized signal from the transmitter, determines whether or not a reception quality of the second polarized signal becomes lower than a threshold value, and issues an instruction to the transmitter to terminate transmission of the second polarized signal to the transmitter when the reception quality becomes less than the threshold value.

9 Claims, 7 Drawing Sheets

(56) References Cited

U.S. PATENT DOCUMENTS

| | | |
|---|---|---|
| 2005/0163271 A1 | 7/2005 | Kaneko |
| 2006/0057971 A1 | 3/2006 | Michida |
| 2006/0135063 A1* | 6/2006 | Katz ............................. 455/25 |
| 2007/0135161 A1* | 6/2007 | Molnar et al. ............. 455/553.1 |
| 2009/0186585 A1 | 7/2009 | Ahrony et al. |
| 2009/0207093 A1* | 8/2009 | Anreddy et al. ............. 343/876 |
| 2009/0227260 A1* | 9/2009 | Anreddy et al. ............. 455/450 |

FOREIGN PATENT DOCUMENTS

| | | |
|---|---|---|
| CN | 101116271 A | 1/2008 |
| EP | 1071159 B1 | 10/2006 |
| JP | 02-082831 A | 3/1990 |
| JP | 10-303871 A | 11/1998 |
| JP | 2000-165340 A | 6/2000 |
| JP | 2001-86051 A | 3/2001 |
| JP | 3335040 B2 | 10/2002 |
| JP | 2003-259414 A | 9/2003 |
| JP | 2003-298546 A | 10/2003 |
| JP | 2005-072739 A | 3/2005 |
| JP | 2007-506291 A | 3/2007 |
| JP | 2007-214780 A | 8/2007 |
| JP | 2009-124361 A | 6/2009 |
| JP | 2009-159453 A | 7/2009 |
| WO | 2009/022474 A1 | 2/2009 |

OTHER PUBLICATIONS

Japanese Office Action dated May 21, 2013 issued by the Japanese Patent Office in corresponding Japanese Patent Application No. 2009-246520.

Communication dated Jul. 9, 2014, issued by the European Patent Office in counterpart European application No. 10826435.9.

* cited by examiner

RADIO COMMUNICATION SYSTEM AND CONTROLLING METHOD THEREOF

CROSS REFERENCE TO RELATED APPLICATION

This application is a National Stage of International Application No. PCT/JP2010/065504 filed Sep. 9, 2010, claiming priority based on Japanese Patent Application No. 2009-246520 filed Oct. 27, 2009, the contents of all of which are incorporated herein by reference in their entirety.

TECHNICAL FIELD

The present invention relates to a same frequency radio communication system and a controlling method of the radio communication system.

BACKGROUND ART

In Patent Literatures 1 and 2, a same frequency (CO-CH: CO-Channel) radio communication system that performs radio communication utilizing vertical polarization and horizontal polarization at the same frequency is described. In the radio communication system, two lines corresponding to the vertical polarization and the horizontal polarization can be utilized for communication. Therefore, usage of the two lines improves the throughput in comparison with a case where only the vertical polarization or horizontal polarization is used for a single transmission.

However, in the CO-CH transmission system, mutual interference occurs between the vertical polarization and the horizontal polarization, so that there is a possibility of communication quality in the CO-CH transmission system being reduced due to mutual interference between the polarizations. In addition, in the CO-CH transmission system, the horizontal polarization and the vertical polarization are attenuated due to factors such as bad weather, and as a result, there is a possibility of the communication quality being reduced.

FIG. 1 illustrates an example of a configuration of a typical CO-CH transmission system.

In such a CO-CH transmission system, when an antenna including a high cross polarization discrimination (XPD) is used, and as illustrated in FIG. 1, when cross polarization interference cancellers (XPICs) 2041 and 2051 are provided at the reception side of the CO-CH transmission system, reduction of communication quality due to mutual interference between the polarization can be prevented.

RELATED ART LITERATURE

Patent Literature

Patent Literature 1: JP2005-72739A
Patent Literature 2: JP2007-214780A

SUMMARY OF INVENTION

Problem to Be Solved by the Invention

However, a high XPD antenna is more expensive than a regular antenna. In addition, when the XPICs are provided to the CO-CH radio transmission system, the cost increases by the cost of the XPICs.

Therefore, in the CO-CH radio communication system, there is a problem in which it is difficult to improve the communication quality at low cost.

The present invention aims to provide a technology for improving the reception quality at low cost in the CO-CH radio communication system.

Solution to Problem

To achieve the above object, a radio communication system according to the present invention includes: a transmitter that transmits a first polarized signal and a second polarized signal to a receiver and terminates the transmission of the second polarized signal in accordance with an instruction of the receiver; and the receiver that receives the first polarized signal and the second polarized signal from the transmitter, determines whether or not the reception quality of the second polarized signal becomes less than the threshold value, and issues an instructions to transmitter to terminate transmission of the second polarized signal when the reception quality of the signal becomes lower than the threshold value.

The transmitter according to the present invention includes: transmission means that transmits a first polarized signal and a second polarized signal to the receiver; reception means that receives an instruction of the receiver; and switching means that causes the transmission means to terminate the transmission of the second polarized signal in accordance with the instruction received by the reception means.

The receiver according to the present invention includes: reception means that receives a first polarized signal and a second polarized signal from the transmitter; determination means that determines whether or not the reception quality of the second polarized signal received by the reception means becomes less than the threshold value; and instruction means that issues to the transmitter to terminate transmission of the second polarized signal when the determination means determines that the reception quality of the signal becomes lower than the threshold value.

A controlling method of a radio communication system according to the present invention includes: transmitting a first polarized signal and a second polarized signal to a receiver by a transmitter, receiving the first polarized signal and the second polarized signal from the transmitter by the receiver, determining whether or not the reception quality of the second polarized signal becomes lower than the threshold value, issuing instructions to transmitter to terminate transmission of the second polarized signal when it is determined that the reception quality of signal becomes lower than the threshold value, and terminating the transmission of the second polarized signal in accordance with the instruction of the receiver by the transmitter.

Advantageous Effects of Invention

According to the present invention, there is no interference between a first polarized signal and a second polarized signal because the transmitter terminates transmission of the second polarized signal when the reception quality of the second polarized signal becomes lower than a threshold value, thereby improving the communication quality of the first polarized signal. In addition, it is not necessary that an antenna including a high XPD and an XPIC be provided to the radio communication system, thereby realizing the improvement of the communication quality at low cost.

DESCRIPTION OF EMBODIMENTS

Figure 1:
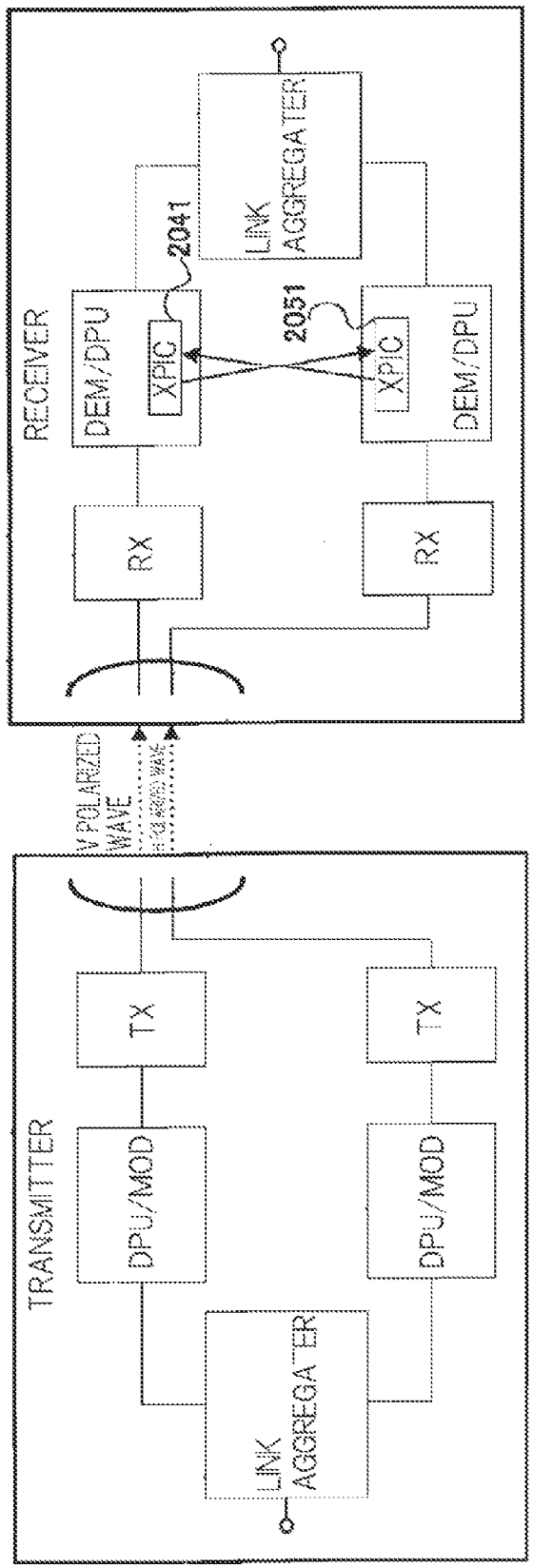
FIG. 1 is an example of an overall diagram of a typical radio communication system.
Figure 2:
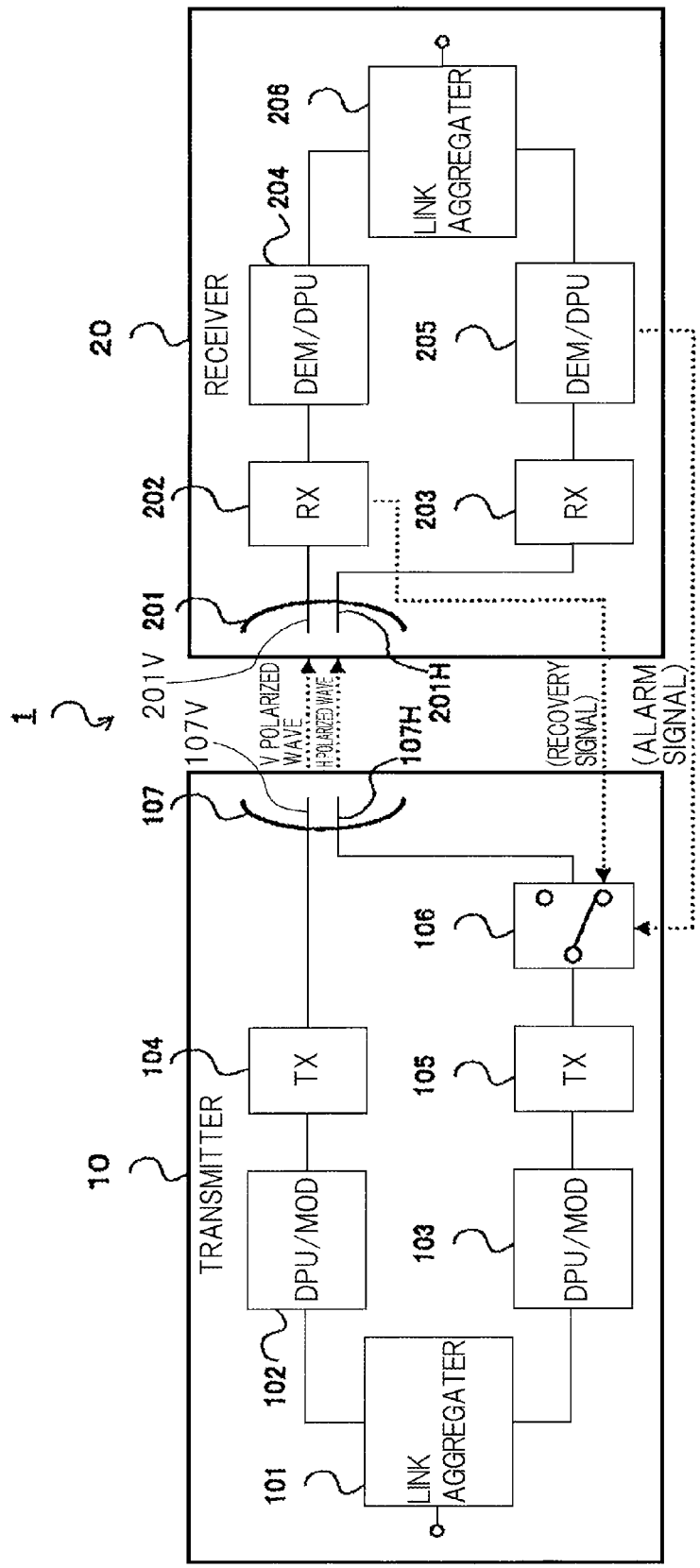
FIG. 2 is an example of an overall diagram of a radio communication system according to an exemplary embodiment.

An exemplary embodiment is described below with reference to drawings. FIG. 2 is an example of an overall diagram of a radio communication system 1 according to the exemplary embodiment. Radio communication system 1 is a radio communication system that transmits and receives a data signal using two lines so as to put the data signal into a microwave of horizontal polarization and a microwave of vertical polarization. It is noted that, in the exemplary embodiment, radio communication system 1 combines the two lines to be used logically as a single line using a link aggregation technology.

In the exemplary embodiment, a transmitted and received data signal is superimposed to each of the horizontal polarization and the vertical polarization, therefore, microwaves of the horizontal polarization and the vertical polarization are referred to as a vertically polarized signal and a horizontally polarized signal, respectively. A data signal that is put into a microwave is, for example, an Ethernet (R) signal.

Referring to FIG. 2, radio communication system 1 includes transmitter 10 and receiver 20. Transmitter 10 transmits a data signal to receiver 20, and receiver 20 receives the data signal from transmitter 10. In addition, receiver 20 transmits a control signal to transmitter 10, and transmitter 10 receives the control signal from receiver 20. A transmitted and received control signal according to the exemplary embodiment includes, for example, an alarm signal and a recovery signal.

Here, the alarm signal is a control signal by which receiver 20 issues instructions of transmitter 10 to terminate transmission of a horizontally polarized signal. The recovery signal is a control signal by which receiver 20 issues instructions to transmitter 10 to resume transmission of the terminated horizontally polarized signal. The data signal, alarm signal, and recovery signal are transmitted and received by radio.

The transmitter 10 includes a transmission circuit and a reception circuit, but only the configuration of the transmission circuit that transmits an Ethernet signal is illustrated in FIG. 2, and the reception circuit is omitted. In addition, receiver 20 includes a transmission circuit and a reception circuit, but only the configuration of the reception circuit that receives an Ethernet signal is illustrated in FIG. 2, and the transmission circuit is omitted.

First, the configuration of transmitter 10 is described. Transmitter 10 includes link aggregater 101, data processing unit/modulator (DPU/MOD) 102, DPU/MOD 103, TX 104, TX 105, switcher 106, and antenna 107. Antenna 107 includes antenna element 107V used for transmission of a vertically polarized signal and antenna element 107H used for transmission of a horizontally polarized signal.

To link aggregater 101, an Ethernet signal is input. Link aggregater 101 divides the input Ethernet signal into two signals so that signal throughput becomes the desired transmission capacity, and the divided signals are output to DPU/MOD 102 and DPU/MOD 103, respectively.

DPU/MOD 102 divides the Ethernet signal from link aggregater 101 by a packet unit, puts the generated packet data into a carrier wave, and outputs the packet data to TX 104. DPU/MOD 103 divides the Ethernet signal from link aggregater 101 by a packet unit, puts the generated packet data into a carrier wave, and outputs the packet data to TX 105.

TX 104 receives and amplifies the electric signal on which the Ethernet signal is superimposed by DPU/MOD 102, and outputs the electric signal to antenna element 107V. TX 105 receives and amplifies the electric signal on which the Ethernet signal is superimposed by DPU/MOD 102, and outputs the electric signal to antenna element 107H through switcher 106.

Switcher 106 receives the control signal from receiver 20 through a reception circuit (not illustrated) and switches a state of ON/OFF in accordance with the control signal. When the state is ON, switcher 106 outputs the electric signal from DPU/MOD 103 to antenna 107, and when the state is OFF, switcher 106 does not output the electric signal.

In an initial state, when switcher 106 is in the ON state and receives an alarm signal from receiver 20, switcher 106 switches to the OFF state. In addition, when switcher 106 receives a recovery signal from receiver 20, switcher 106 switches to the ON state.

Antenna element 107V converts the electric signal from TX 104 into a vertically polarized signal and outputs the signal, and antenna element 107H converts the electric signal from TX 105 into a horizontally polarized signal and outputs the signal.

Next, the configuration of receiver 20 is described. Receiver 20 includes antenna 201, RX 202, RX 203, demodulator (DEM)/DPU 204, DEM/DPU 205, and link aggregater 206. Antenna 201 includes antenna element 201V used for reception of a vertically polarized signal and antenna element 201H used for reception of a horizontally polarized signal.

Antenna element 201V receives a vertically polarized signal, converts the vertically polarized signal into an electric signal, and outputs the signal to RX 202. Antenna element 201H receives a horizontally polarized signal, converts the horizontally polarized signal into an electric signal, and outputs the signal to RX 203.

RX 202 amplifies the electric signal from antenna element 201V and outputs the signal to DEM/DPU 204. RX 203 amplifies the electric signal from antenna element 201H and outputs the signal to DEM/DPU 205.

In addition, RX 202 measures the level of the electric signal from antenna element 201V, that is, the reception electric field level of a vertically polarized signal. In addition, RX 202 estimates the reception quality of a horizontally polarized signal in a case where transmission of the horizontally polarized signal is resumed, from the measured reception electric field level.

Here, the reception quality includes, for example, the system failure rate (system outage) and a bit error rate (BER).

When the reception quality becomes greater than or equal to a threshold value, RX 202 transmits a recovery signal to transmitter 10 through a transmission circuit (not illustrated).

DEM/DPU 204 extracts an Ethernet signal from the electric signal output from RX 202 and outputs the Ethernet signal to link aggregater 206.

In addition, DEM/DPU 205 monitors the electric signal from RX 203 and determines whether or not the reception quality of the horizontally polarized signal becomes lower than the threshold value. In the exemplary embodiment, when communication in which the electric signal from RX 203 is utilized is disconnected, DEM/DPU 205 may determine that the reception quality of the horizontally polarized signal becomes lower than the threshold value.

In addition, when the reception quality of the horizontally polarized signal becomes lower than the threshold value, DEM/DPU 204 transmits an alarm signal to transmitter 10 through a transmission circuit (not illustrated).

DEM/DPU 205 extracts an Ethernet signal from the electric signal output from RX 203 and outputs the Ethernet signal to link aggregater 206.

Link aggregater 206 logically combines Ethernet signals from two lines including DEM/DPU 204 and DEM/DPU 204 and outputs the Ethernet signals as an Ethernet signal for a single line.

Figure 3:
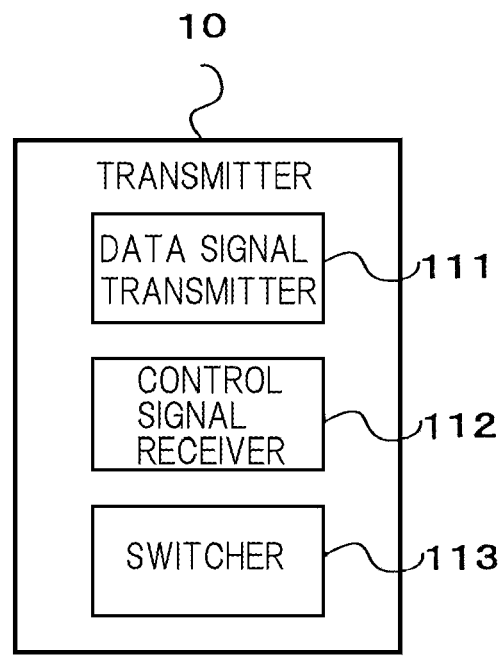
FIG. 3 is a block diagram illustrating a configuration example of a transmitter according to the present invention.

FIG. 3 is a block diagram illustrating a configuration of transmitter 10. Referring to FIG. 3, transmitter 10 includes data signal transmitter 111, control signal receiver 112, and switcher 113.

Link aggregater 101, DPU/MOD 102, DPU/MOD 103, TX 104, TX 105, and antenna 107 in FIG. 2 correspond to data signal transmitter 111 in FIG. 3. In addition, the reception circuit omitted in FIG. 2 corresponds to control signal receiver 112 in FIG. 3. Switcher 106 in FIG. 2 corresponds to switcher 113 in FIG. 3.

Data signal transmitter 111 puts an Ethernet signal that is a data signal into a horizontally polarized signal and a vertically polarized signal and transmits the signals to receiver 20. In addition, data signal transmitter 111 terminates and resumes transmission of the horizontally polarized signal in accordance with the control of switcher 113.

Control signal receiver 112 receives an alarm signal or a recovery signal that is a control signal, from receiver 20.

Switcher 113 causes data signal transmitter 111 to terminate transmission of the horizontally polarized signal when control signal receiver 112 receives an alarm signal. In addition, when control signal receiver 112 receives a recovery signal, switcher 113 causes data signal transmitter 111 to resume transmission of the horizontally polarized signal.

Figure 4:
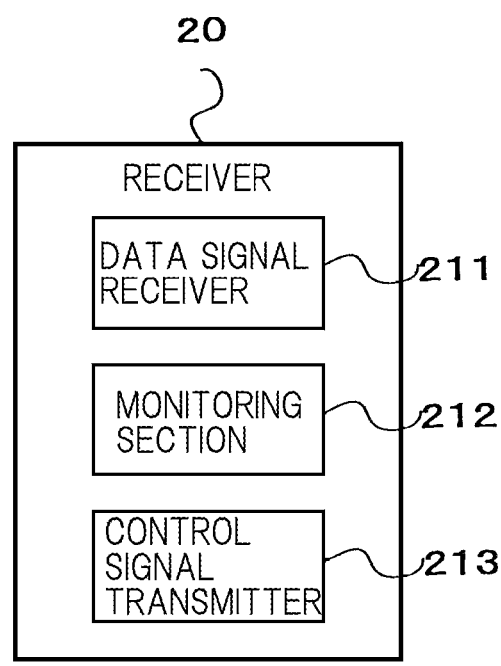
FIG. 4 is a block diagram illustrating a configuration example of a receiver according to the present invention.

FIG. 4 is a block diagram illustrating a configuration of receiver 20. Referring to FIG. 4, receiver 20 includes data signal receiver 211, monitoring section 212, and control signal transmitter 213.

A configuration including a part of RX 202 and a part of DEM/DPU 205, antenna 201, RX 203, and DEM/DPU 204 in FIG. 2 correspond to data signal receiver 211 in FIG. 4. A configuration including another part of RX 202 and another part of DEM/DPU 205 in FIG. 2 that are not included in the data signal receiver 211, correspond to monitoring section 212 in FIG. 4. The transmission circuit omitted in FIG. 2 corresponds to control signal transmitter 213 in FIG. 4.

Data signal receiver 211 receives a horizontally polarized signal and a vertically polarized signal on which an Ethernet signal, that is a data signal, is superimposed, from transmitter 10.

Monitoring section 212 monitors the reception quality of a horizontally polarized signal. Before transmission of an alarm signal, monitoring section 212 determines whether or not the reception quality of the horizontally polarized signal becomes lower than a threshold value based on whether or not disconnection of communication that utilizes the horizontally polarized signal occurs. After the transmission of the alarm signal, monitoring section 212 estimates the reception quality of the horizontally polarized signal from the reception electric field level of a vertically polarized signal and determines whether or not the reception quality becomes greater than or equal to the threshold value.

Control signal transmitter 213 transmits an alarm signal that is a control signal to transmitter 10 when monitoring section 212 determines that the reception quality of the horizontally polarized signal becomes lower than the threshold value. In addition, control signal transmitter 213 transmits a recovery signal that is a control signal to transmitter 10 when monitoring section 212 determines that the reception quality of the horizontally polarized signal becomes greater than or equal to the threshold value.

Figure 5:
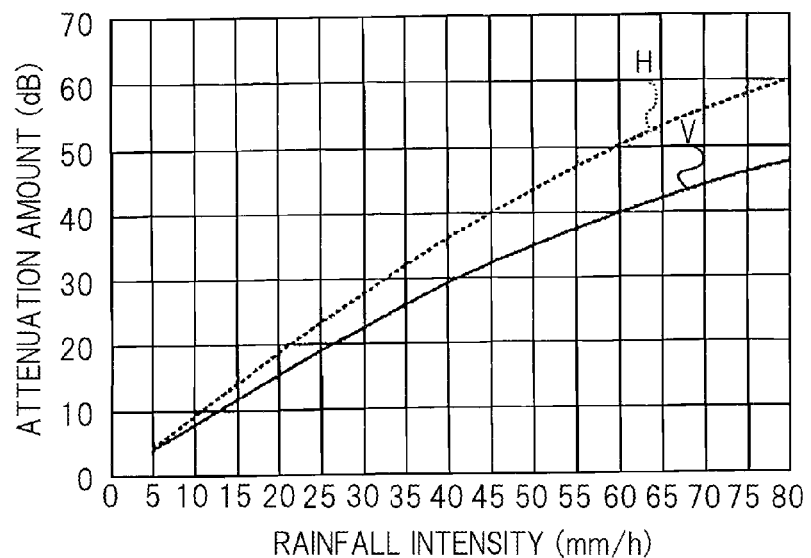
FIG. 5 is a diagram illustrating the relationship between the attenuation amount of a microwave and rainfall intensity.
Figure 6:
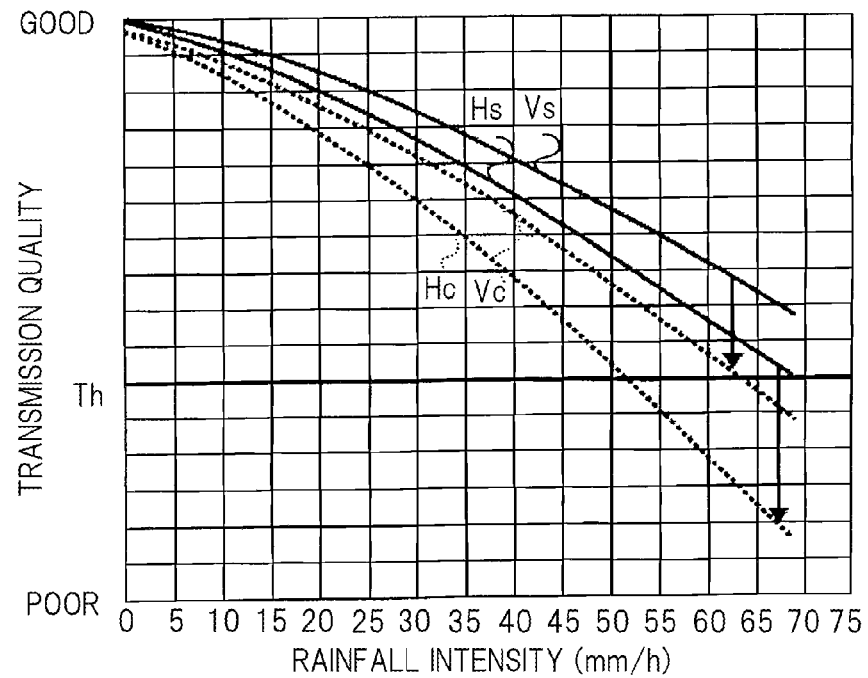
FIG. 6 is a diagram illustrating the relationship between a reception quality of a microwave and rainfall intensity.
Figure 7:
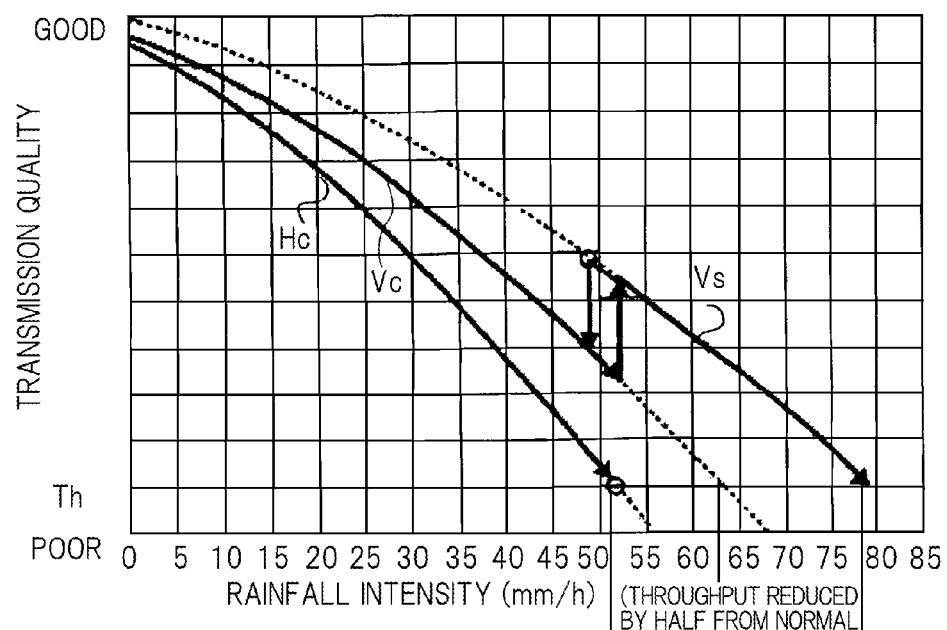
FIG. 7($a$) is a diagram illustrating the relationship between reception quality and rainfall intensity in the exemplary embodiment, FIG. 7($b$) is a diagram illustrating the relationship between a throughput and rainfall intensity in a typical system, and FIG. 7($c$) is a diagram illustrating the relationship between throughput and rainfall intensity in the exemplary embodiment.

Next, referring to FIGS. 5 to 7, an effect of terminating transmission of a horizontally polarized signal at the transmission side based on the reception quality of the horizontally polarized signal is described.

FIG. 5 is a diagram illustrating the relationship between the attenuation amount of a horizontally polarized signal and a vertically polarized signal, and rainfall intensity. A vertical axis in FIG. 5 indicates the attenuation amount (dB) of each horizontally polarized signal and each vertically polarized signal, and a horizontal axis indicates rainfall intensity (mm/h). A solid line H indicates characteristics of a horizontally polarized signal, and a broken line V indicates characteristics of a vertically polarized signal.

As illustrated in FIG. 5, as rainfall intensity increases, the attenuation amount of each horizontally polarized signal and each vertically polarized signal increases. In addition, attenuation of a microwave due to rainfall always becomes greater on the horizontal polarization side of an antenna than on the vertical polarization side of the antenna. That is, in microwave communication, the transmission quality during rainfall is generally lower on the horizontal polarization side than on the vertical polarization side with the same rainfall intensity.

Therefore, in order to avoid interruption of communications due to weather, when transmission of one horizontally polarized signal and one vertically polarized signal is terminated, it is desirable that the transmission of the horizontally polarized signal that is easy to be affected by rainfall be terminated.

FIG. 6 is a diagram illustrating the relationship between reception quality and rainfall intensity in each CO-CH transmission and the single transmission. A vertical axis in FIG. 6 indicates transmission quality including the system failure rate and BER, and a horizontal axis indicates rainfall intensity. Solid lines Vs and Hs indicate characteristics of a horizontally polarized signal and a vertically polarized signal in the single transmission, respectively, and dashed lines Vc and Hc indicate characteristics of a horizontally polarized signal and a vertically polarized signal in the CO-CH transmission, respectively. The length of the arrow indicates the transmission quality amount of a portion deteriorated due to mutual interference between a horizontally polarized signal and a vertically polarized signal. A heavy line indicates a threshold value Th of reception quality when disconnection of communication utilizing a horizontally polarized signal is caused.

As illustrated in FIG. 6, in the CO-CH transmission system, interference between a horizontally polarized signal and a vertically polarized signal deteriorates transmission quality.

Thus, in a general CO-CH transmission system, it is necessary that a high XPD antenna or an XPIC is provided in order to reduce the interference portion. In addition, the general CO-CH transmission system keeps outputting a horizontally polarized signal, even when the horizontally polarized signal becomes lower than a threshold value (Th), so that a vertically polarized signal is still affected by the interference from the horizontally polarized signal.

Therefore, when a horizontally polarized signal becomes lower than the threshold value, it is desirable that transmission of the horizontally polarized signal at transmission side be terminated.

FIG. 7(a) is a diagram illustrating the relationship between reception quality and rainfall intensity in radio communication system 1 according to the exemplary embodiment. A vertical axis in FIG. 7(a) indicates transmission quality including a system failure rate and BER, and a horizontal axis indicates rainfall intensity. Solid lines Vc and Hc indicate characteristics of a horizontally polarized signal and a vertically polarized signal in the CO-CH transmission, and a solid line Vs indicates characteristics of a vertically polarized signal in the single transmission. The point indicated by a circle on solid line Hc indicates a time point at which an alarm signal is output, and the point indicated by a circle on solid line Vs indicates a time point at which a recovery signal is output. A heavy line indicates a threshold value Th of the reception quality when disconnection of communication utilizing a horizontally polarized signal is caused.

As illustrated in FIG. 7(a), as rainfall intensity increases starting from a state where it is not raining, the reception quality of a horizontally polarized signal and a vertically polarized signal in the CO-CH transmission is deteriorated. When the reception quality of the horizontally polarized signal becomes lower than the threshold value, transmitter 10 terminates the transmission of the horizontally polarized signal in accordance with an alarm signal from receiver 20 and switches to the single transmission.

A case where the CO-CH transmission is still continued even when the reception quality of a horizontally polarized signal becomes lower than the threshold value is considered. In this case, a vertically polarized signal is still affected by interference from the horizontally polarized signal, so that, as illustrated in FIG. 6, the transmission quality of the vertically polarized signal deteriorates as rainfall intensity increases.

On the other hand, as described above, transmitter 10 according to the exemplary embodiment terminates the transmission of a horizontally polarized signal when an alarm signal is received. Therefore, interference which a vertically polarized signal by the horizontally polarized signal, that is, leakage is eliminated, thereby improving the reception quality of the vertically polarized signal, as illustrated by a pointing-up arrow in FIG. 7(a).

Next, a case where transmission of a horizontally polarized signal is resumed as rainfall intensity decreases is described below with reference to FIG. 7(a).

After switching to the single transmission, receiver 20 estimates the reception quality of a horizontally polarized signal when transmission resumption of the horizontally polarized signal is resumed, based on the reception electric field level of a vertically polarized signal.

The reception electric field level of a vertically polarized signal in the single during a time of intense rainfall in which the reception quality of a horizontally polarized signal becomes lower than a threshold value is registered in advance as a specific value. When the reception electric field level of a vertically polarized signal exceeds the reception electric field level (specific value), it is estimated that the reception quality of a horizontally polarized signal becomes greater than or equal to the threshold value. At this time, receiver 20 transmits a recovery signal to transmitter 10. Transmitter 10 resumes transmission of the horizontally polarized signal in accordance with the recovery signal. It is noted that the specific value is a value greater than the reception electric field level of a vertically polarized signal during a time of intense rainfall when the communication is disconnected.

FIG. 7(b) is a diagram illustrating the relationship between throughput and rainfall intensity in a radio communication system which does not switch to a single transmission from the CO-CH transmission. FIG. 7(c) is a diagram illustrating a relation between throughput and rainfall intensity in radio communication system 1 according to the exemplary embodiment. Vertical axes in FIGS. 7(b) and 7(c) indicate rainfall intensity.

As illustrated in FIG. 7(b), when rainfall intensity becomes a value corresponding to threshold value Th of reception quality, communication in which a data signal is transmitted and received using a horizontal polarization as a carrier wave is disconnected. Therefore, in radio communication system 1, a throughput is reduced by lines corresponding to the horizontally polarized signals. In addition, as rainfall intensity increases, the reception quality of the vertically polarized signal is also reduced, and communication corresponding to the vertically polarized signal is also disconnected.

As illustrated in FIG. 7(c), similar to the case of FIG. 7(b), in radio communication system 1 according to the exemplary embodiment, when rainfall intensity becomes a value corresponding to the threshold value of a reception quality, the throughput is reduced due to the termination of transmission of a horizontally polarized signal. However, as illustrated in 7(a), mutual interference between the polarization is eliminated by switching to the single transmission, thereby improving reception quality of the vertically polarized signal. Therefore, in the case of FIG. 7(b), radio communication system 1 can continue to perform communication even when rainfall intensity is high enough to cause disconnection of the communication.

Figure 8:
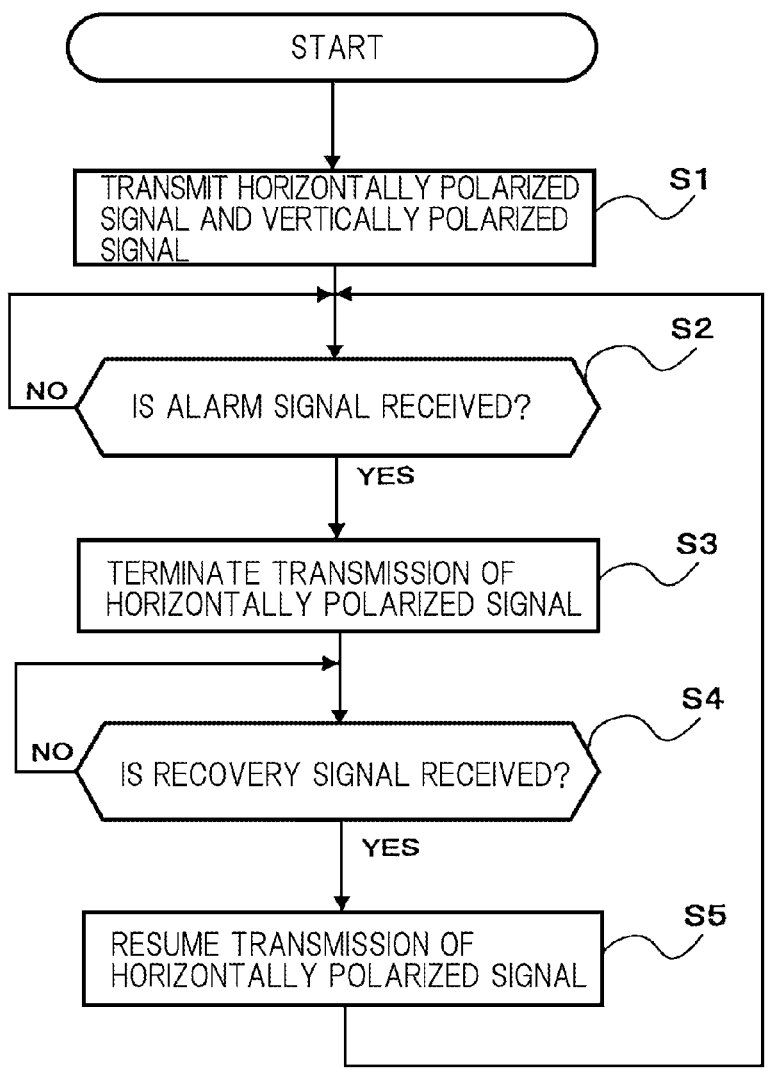
FIG. 8 is a flowchart illustrating an operation of the transmitter according to the exemplary embodiment.
Figure 9:
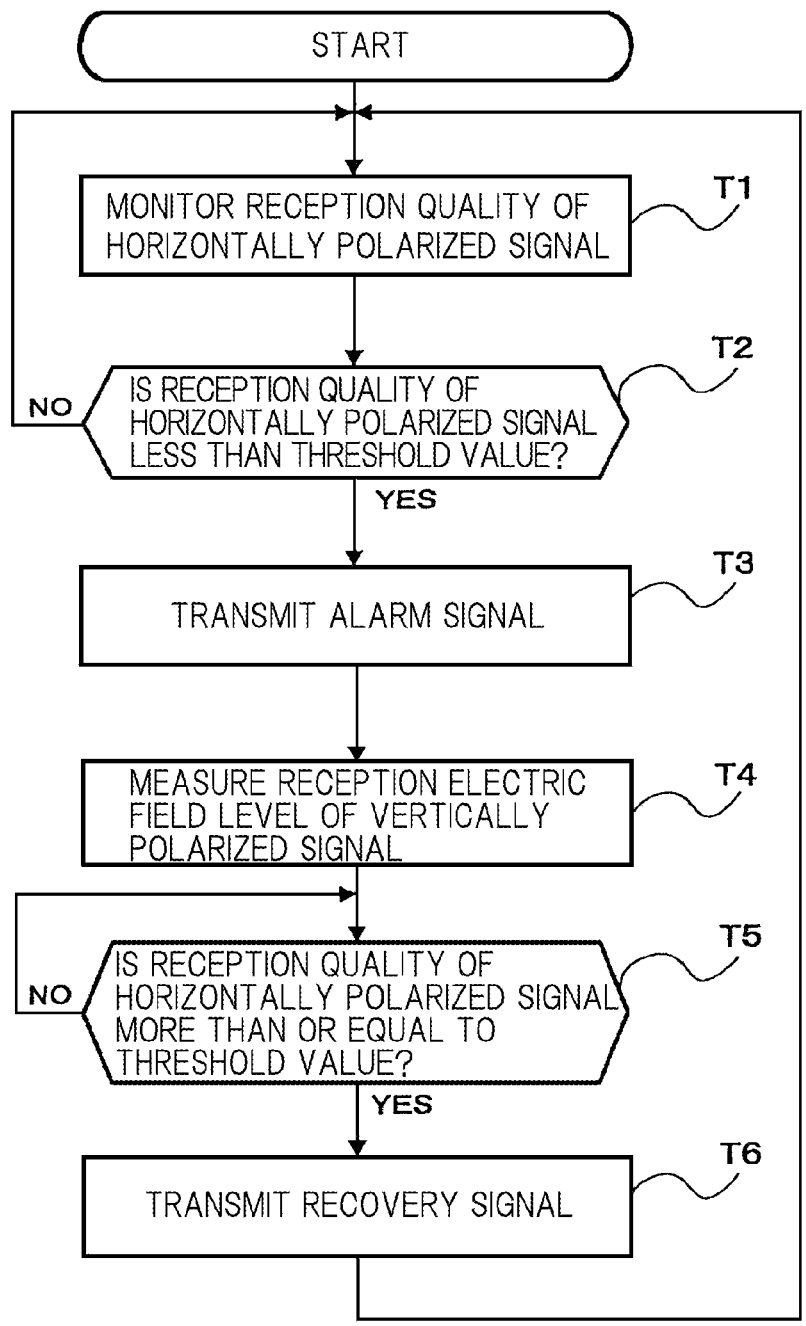
FIG. 9 is a flowchart illustrating an operation of the receiver according to the exemplary embodiment.

Referring to FIGS. 8 and 9, operations of radio communication system 1 are described. FIG. 8 is a flowchart illustrating an operation of transmitter 10. The operation starts when an Ethernet signal to be transmitted to receiver 20 is input to transmitter 10.

Transmitter 10 transmits a horizontally polarized signal and a vertically polarized signal into which an Ethernet signal is put, to receiver 20 (Step S1).

During transmission of the horizontally polarized signal and the vertically polarized signal, transmitter 10 determines whether or not an alarm signal is received from receiver 20

(Step S2). When an alarm signal is not received (Step S2: NO), transmitter 10 returns to Step S2.

When an alarm signal is received (Step S2: YES), transmitter 10 terminates the transmission of the horizontally polarized signal and switches to single transmission only for the vertically polarized signal (Step S3).

Next, transmitter 10 determines whether or not a recovery signal from receiver 20 is received during the single transmission only for the vertically polarized signal (Step S4). When a recovery signal is not received (Step S4: NO), transmitter 10 returns to Step S4.

When a recovery signal is received (Step S4: YES), transmitter 10 resumes transmission of the horizontally polarized signal and switches to the CO-CH transmission (Step S5). After Step S5, transmitter 10 returns to Step S2.

FIG. 9 is a flowchart illustrating an operation of receiver 20. The operation starts when a horizontally polarized signal and a vertically polarized signal into which an Ethernet signal is put are received from transmitter 10.

Receiver 20 monitors the reception quality of a horizontally polarized signal (Step T1). Receiver 20 determines whether or not the reception quality of the horizontally polarized signal becomes lower than a threshold value. In the exemplary embodiment, receiver 20 determines that the reception quality of the horizontally polarized signal becomes lower than the threshold value when disconnection of the communication of a line at the horizontal polarization side is detected (Step T2). Receiver 20 returns to Step T1 when the reception quality does not become lower than the threshold value (Step T2: NO).

When the reception quality becomes lower than the threshold value (Step T2: YES), receiver 20 transmits an alarm signal to transmitter 10 (Step T3).

In addition, after transmitting the alarm signal, receiver 20 measures the reception electric field level of a vertically polarized signal (Step T4). Receiver 20 estimates the reception quality of a horizontally polarized signal when the transmission of the horizontally polarized signal is resumed, based on the reception electric field level and determines whether or not the reception quality becomes greater than or equal to the threshold value (Step T5). When the estimated reception quality does not become greater than the threshold value, receiver 20 returns to Step T4.

When the estimated reception quality becomes greater than the threshold value, receiver 20 transmits recovery signal to transmitter 10 (Step T6). After Step T6, receiver 20 returns to Step T1.

It is noted that, as described above, the reception quality of a horizontally polarized signal is more affected by rainfall intensity than that of a vertically polarized signal. Therefore, transmitter 10 terminates transmission of the horizontally polarized signal on the assumption that rainfall is occurring.

However, the reception quality of a vertically polarized signal may be more affected than the reception quality of horizontally polarized signal depending on various factors that influence deterioration of the signal quality. For example, the reception quality of a vertically polarized signal may fall below the reception quality of a horizontally polarized signal due to a failure of an antenna element for transmitting a vertically polarized signal. Therefore, transmitter 10 may be configured to terminate transmission of the vertically polarized signal in accordance with the reception quality of the vertically polarized signal when assuming such a factor other than rainfall.

In addition, transmitter 10 may not be configured to always terminate one signal, but to monitor reception qualities of both a horizontally polarized signal and a vertically polarized signal, and when the reception quality of one of the signals becomes lower than a threshold value, transmitter 10 may be configured to terminate transmission of the signal.

A configuration to terminate a vertically polarized signal may be allowed because the reception quality of a horizontally polarized signal is not always lower than that of the vertically polarized signal when the reception quality is reduced due to reasons other than rainfall. For example, the reception quality of a vertically polarized signal may be lower than that of horizontally polarized signal when a failure of an antenna element for transmitting a vertically polarized signal occurs.

In addition, in the exemplary embodiment, transmitter 10 is automatically restored after the transmission of a horizontally polarized signal is terminated and the reception quality is restored, and alternatively, a configuration in which transmitter 10 is not autonomously restored may be employed. For example, as described above, when assuming reduction of reception quality due to a failure, a configuration to restore to CO-CH transmission may be employed though a user operation after repair have been completed.

In the exemplary embodiment, receiver 20 determines whether or not a reception quality of a horizontally polarized signal becomes less than a threshold value based on the presence or absence of disconnection of communication. However, receiver 20 may determine whether or not a reception quality of a horizontally polarized signal becomes less than a threshold value based on events other than the presence or absence of disconnection of communication or based on monitoring of parameters. For example, receiver 20 may measure a BER or a system failure rate of a line corresponding to a horizontally polarized signal and measure a reception electric field level of the horizontally polarized signal.

In the exemplary embodiment, receiver 20 estimates the reception quality of a horizontally polarized signal based on the reception electric field level of a vertically polarized signal. However, when there is a parameter capable of estimating the reception quality of a horizontally polarized signal, receiver 20 may determine whether or not the reception quality of the horizontally polarized signal becomes greater than or equal to a threshold value based on other parameters. For example, the BER or the system failure rate of a line corresponding to a vertically polarized signal may be employed.

In addition, in the exemplary embodiment, a configuration in which the high XPD antenna or the XPIC is not provided is employed, however, a configuration in which the high XPD antenna or the XPIC is provided may be employed when it is desirable to further improve reception quality. Even in this case, as described above, the communication quality of radio communication system 1 is improved in comparison with the communication quality of a system in which the transmission of a horizontally polarized signal is not terminated. Therefore, even in a case where both the high XPD antenna and the XPIC need to be provided in the system in which transmission of a horizontally polarized signal is not terminated in order to realize the desired communication quality, radio communication system 1 does not require one of the high XPD antenna and the XPIC, so that the cost is often reduced.

It is noted that a vertically polarized signal according to the exemplary embodiment corresponds to a first polarized signal according to the present invention, and a horizontally polarized signal according to the exemplary embodiment corresponds to a second polarized signal according to the present invention.

As described above, according to the exemplary embodiment, when the reception quality of the second polarized signal becomes lower than a threshold value, interference between a first polarized signal and the second polarized signal is eliminated because the transmitter terminates the transmission of the second polarized signal, thereby improving the communication quality of the first polarized signal. In addition, it is not necessary that the antenna includes a high XPD or an XPIC be provided. While it is necessary to provide a circuit or software in order to control the transmission and a polarized signal to control terminating the transmission of a polarized signal, the cost of providing the circuit or the software is less expensive than that of an antenna that includes the high XPD or the XPIC. Therefore improvement of communication quality can be realized at low cost.

In addition, when the reception quality becomes greater than or equal to the threshold value, transmitter 10 resumes the transmission of a horizontally polarized signal in accordance with a recovery signal, so that radio communication system 1 can be autonomously restored to the CO-CH transmission and can improve a throughput.

As described above, when there is rainfall, attenuation of a horizontally polarized signal is greater than that of a vertically polarized signal. Therefore, in a case where it is assumed that a reduction in communication quality is due to rainfall, when the transmission of a horizontally polarized signal is terminated, the impact on the communication is reduced in comparison with the transmission termination of a vertically polarized signal.

It is not necessary that a configuration for measuring the reception quality be provided because receiver 20 determines whether or not the reception quality becomes lower than the threshold value based on whether or not of disconnection of communication occurs, and the reception quality can be improved by using a simple configuration.

Receiver 20 measures the reception electric field level of a vertically polarized signal after transmitting an alarm signal. At this point, the transmission of a horizontally polarized signal is terminated, however, as illustrated in FIG. 6, there is a correlation between the reception quality of the vertically polarized signal in the single transmission and a reception quality of a horizontally polarized signal in the CO-CH transmission. Therefore, receiver 20 can estimate the reception quality in a case where the transmission of a horizontally polarized signal is resumed while transmission of the horizontally polarized signal is being terminated by measuring the reception electric field level of a vertically polarized signal.

This application claims priority based on Japanese Patent Application No. 2009-246520, filed on 27 Oct. 2009, which is incorporated herein by reference in its entirety.

What is claimed is:

1. A radio communication system comprising:
   a transmitter configured to:
     transmit a first polarized signal and a second polarized signal to a receiver, and
     terminate the transmission of the second polarized signal in accordance with an instruction to terminate transmission of the second polarized signal received from said receiver, the first and the second polarized signal being signals of cross polarization; and
   said receiver configured to:
     receive the first and the second polarized signals from said transmitter,
     issue said instruction based on a result of monitoring if a system failure occurs or not,
   wherein said receiver is further configured to determine whether or not a reception quality of the second polarized signal becomes lower than a threshold value by measuring a reception electric field level of the first polarized signal, issue the instruction to said transmitter to terminate transmission of the second polarized signal when the reception quality becomes lower than the threshold value, estimate whether or not the reception quality of the second polarized signal, in a case where transmission of the second polarized signal is resumed after said receiver issues the instruction to terminate transmission of the second polarized signal to said transmitter, becomes greater than or equal to the threshold value, and issue an instruction to resume transmission of the second polarized signal to said transmitter when the reception quality becomes greater than or equal to the threshold value,
   wherein said transmitter is further configured to resume the transmission of the second polarized signal when said transmitter receives the instruction to resume transmission of the second polarized signal after the transmission of the second polarized signal is terminated, and
   wherein said receiver is further configured to determine that the reception quality of the second polarized signal becomes greater than or equal to the threshold value when the reception electric field level of said first polarized signal becomes greater than or equal to a specific value after said receiver issues the instruction to said transmitter to terminate transmission of the second polarized signal.

2. The radio communication system according to claim 1, wherein
   the specific value is a value greater than the reception electric field level of the first polarized signal during a time of intense rainfall when a communication is disconnected.

3. The radio communication system according to claim 1, wherein
   said receiver is further configured to determine that the reception quality of the second polarized signal has become lower than the threshold value when communication utilizing the second polarized signal is disconnected before said receiver issues the instruction to terminate transmission of the second polarized signal to said transmitter.

4. The radio communication system according to claim 1, wherein
   the first polarized signal is a vertically polarized signal, and the second polarized signal is a horizontally polarized signal.

5. The radio communication system according to claim 1, wherein the transmitter comprises a switch that turns OFF the transmission of the second polarized signal upon receiving the instruction to terminate the transmission of the second polarized signal.

6. The radio communication system according to claim 5, wherein the switch turns ON the transmission of the second polarized signal upon receiving an instruction to resume the transmission of the second polarized signal from the receiver.

7. A transmitting device comprising:

a transmitter configured to transmit a first polarized signal and a second polarized signal to a receiving device, the first and second polarized signals being signals of cross polarization;

a receiver configured to receive an instruction from the receiving device to terminate transmission of the second polarized signal; and a switch configured to terminate the transmission of the second polarized signal by the transmitter, in accordance with the instruction received by said receiver, wherein the receiver receives the instruction to terminate the transmission of the second polarized signal based on a result of monitoring if a system failure occurs or not, the instruction to said transmitter to terminate transmission of the second polarized signal when it is determined by the receiving device that a reception quality of the second polarized signal becomes lower than a threshold value by measuring a reception electric field level of the first polarized signal, and said transmitter is further configured to resume the transmission of the second polarized signal when said receiver receives an instruction to resume transmission of the second polarized signal after the transmission of the second polarized signal is terminated, the instruction to resume is based on a result of:

estimating, by the receiving device, whether or not the reception quality of the second polarized signal, in a case where transmission of the second polarized signal is resumed after said receiver receives the instruction to terminate transmission of the second polarized signal, becomes greater than or equal to the threshold value, wherein the reception quality of the second polarized signal is determined by the receiving device to become greater than or equal to the threshold value when the reception electric field level of said first polarized signal becomes greater than or equal to a specific value after said receiver receives the instruction to terminate transmission of the second polarized signal.

8. A receiving device comprising:

a receiver configured to receive a first polarized signal and a second polarized signal from a transmitting device, the first and the second polarized signals being signals of cross polarization;

a monitor configured to determine whether or not a reception quality of the second polarized signal received by said receiver becomes lower than a threshold value by measuring a reception electric field level of the first polarized signal; and a transmitter configured to issue an instruction to the transmitting device to terminate transmission of the second polarized signal based on a result of monitoring if a system failure occurs or not, wherein said receiving device is further configured to determine whether or not a reception quality of the second polarized signal becomes lower than a threshold value by measuring a reception electric field level of the first polarized signal, issue the instruction to said transmitting device to terminate transmission of the second polarized signal when the reception quality becomes lower than the threshold value, estimate whether or not the reception quality of the second polarized signal, in a case where transmission of the second polarized signal is resumed after said receiving device issues the instruction to terminate transmission of the second polarized signal to said transmitting device, becomes greater than or equal to the threshold value, and issue an instruction to said transmitting device to resume transmission of the second polarized signal when the reception quality becomes greater than or equal to the threshold value, and wherein said receiving device determines that the reception quality of the second polarized signal becomes greater than or equal to the threshold value when the reception electric field level of said first polarized signal becomes greater than or equal to a specific value after said receiving device issues the instruction to said transmitting device to terminate transmission of the second polarized signal.

9. A controlling method of a radio communication system including a transmitter and a receiver comprising:

transmitting a first polarized signal and a second polarized signal to the receiver by the transmitter, the first and the second polarized signals being signals of cross polarization;

receiving the first polarized signal and the second polarized signal from the transmitter by the receiver;

determining, by the receiver, whether or not a reception quality of the second polarized signal becomes less than a threshold value by measuring a reception electric field level of the first polarized signal;

issuing, by the receiver to the transmitter, an instruction of termination of the second polarized signal based on a result of monitoring if a system failure occurs or not; and terminating, by the transmitter, the transmission of the second polarized signal in accordance with the instruction from the receiver, wherein the method further comprises:

issuing, by the receiver to said transmitter, the instruction of termination of the second polarized signal when the reception quality becomes lower than the threshold value, estimating, by the receiver, whether or not the reception quality of the second polarized signal, in a case where transmission of the second polarized signal is resumed after said receiver issues the instruction to terminate transmission of the second polarized signal to said transmitter, becomes greater than or equal to the threshold value;

issuing, by the receiver, an instruction to resume transmission of the second polarized signal to said transmitter when the reception quality becomes greater than or equal to the threshold value;

resuming, by the transmitter, the transmission of the second polarized signal when said transmitter receives the instruction to resume transmission of the second polarized signal after the transmission of the second polarized signal is terminated, and wherein the reception quality of the second polarized signal is determined by the receiver to become greater than or equal to the threshold value when the reception electric field level of said first polarized signal becomes greater than or equal to a specific value after said receiver issues the instruction to said transmitter to terminate transmission of the second polarized signal.

* * * * *